United States Patent [19]

Kump

[11] 4,334,359

[45] Jun. 15, 1982

[54] CONTAINERS

[76] Inventor: Ernest J. Kump, 6-7 Grosvenor Pl., London, SW1, England

[21] Appl. No.: 128,843

[22] Filed: Mar. 10, 1980

Related U.S. Application Data

[63] Continuation of Ser. No. 956,276, Oct. 31, 1978, abandoned.

[30] Foreign Application Priority Data

Nov. 4, 1977 [GB] United Kingdom ............... 46013/77
May 31, 1978 [GB] United Kingdom ............... 24986/78

[51] Int. Cl.³ ......................... F16B 12/00; B65D 6/00
[52] U.S. Cl. ..................................... 312/111; 220/4 F
[58] Field of Search ........................... 220/20, 22, 4 F; 312/111, 108

[56] References Cited

U.S. PATENT DOCUMENTS

| | | | |
|---|---|---|---|
| 608,042 | 7/1898 | Heath | 220/4 F |
| 1,930,968 | 10/1933 | Doesinger | 220/4 F |
| 2,883,764 | 4/1959 | Stephens | 220/4 F |
| 3,047,183 | 7/1962 | Papa | 220/4 F |
| 3,327,882 | 6/1967 | Andrews | 220/4 F |
| 3,392,867 | 7/1968 | Morris | 220/4 F |
| 3,412,846 | 11/1968 | Spadaro | 220/22 |
| 3,841,727 | 10/1974 | Peng | 312/111 |
| 3,897,871 | 8/1975 | Zinnbauer | 211/40 |
| 3,987,924 | 10/1976 | Ditz | 220/4 F |
| 4,106,828 | 8/1978 | Belokin, Jr. | 312/108 |

*Primary Examiner*—Joseph Man-Fu Moy
*Attorney, Agent, or Firm*—Flehr, Hohbach, Test, Albritton & Herbert

[57] ABSTRACT

A container comprises a rectangular hollow box divided into four wall components by lines contained in the planar portions of the walls so that the wall components each include portions of two walls. Splines are provided for locating the adjacent wall components together along said lines and a locking frame is provided for locking the wall components together when so located. The interior walls of the box are covered with a multiplicity of protrusions arranged in rows in two directions for locating shelves, drawers and the like.

1 Claim, 16 Drawing Figures

CONTAINERS

This is a continuation of application Ser. No. 956,276 filed Oct. 31, 1978 now abandoned.

The invention relates to containers and more particularly, but not exclusively, to such containers which are useful for storing files, paper and other office requisites.

In one aspect, the invention provides a container comprising a hollow open-ended polygonal box, said box being divided into a plurality of wall components along lines contained in the planar portions of the walls of the box so that at least some of the wall components include portions of at least two walls, in which means are provided on adjacent wall components for locating the said adjacent wall components together along said lines and means are provided to lock said wall components together once so located.

Preferably the container is rectangular and there are four wall components each comprising two wall portions joined together at right angles. Preferably each wall portion is generally rectangular.

The locating means may comprise rectangular splines which are a push fit in slots formed in the free edges of the wall portions parallel to the joined edges. Alternatively the splines may be permanently fixed to or integrally formed with one of the components.

The locking means may comprise a polygonal frame engaging means being provided for engaging the frame with one of the ends of the container. The engaging means may comprise spline projections which fit in slots. The frame may have a panel enclosed therein for closing off one end of the storage container or may have a door hinged thereto.

The invention also provides a storage container comprising a hollow polygonal box having at least one pair of opposed sides in which a multiplicity of protrusions are provided, which protrusions are arranged in rows in at least a substantial portion of the inside surfaces of said opposed walls for locating shelves, drawers and the like within the container in any of a number of positions.

The containers described above may be stacked to form office units and such units may include a desk top supported by two or more of the containers.

Further features and advantages of the invention will be apparent from the following description, by way of example, of some embodiments of the invention, the description being read with reference to the accompanying drawings, in which.

Figure 1:
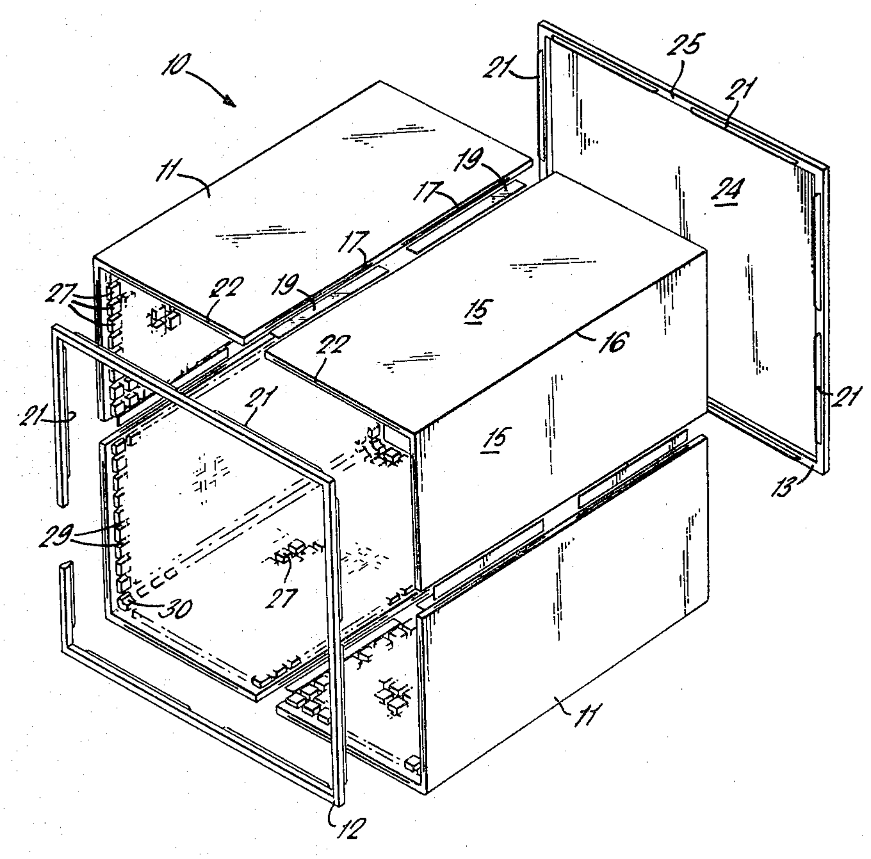
FIG. 1 is an exploded perspective view of a storage container according to the invention.

Referring first to FIG. 1, a storage container, generally indicated by 10, comprises four wall components 11, a locking frame 12 and a back panel 13.

Each wall component 11 has two equal rectangular wall portions 15 which are rigidly joined together at right angles to form a component of L-shaped cross-section. The wall portions 15 are rigidly joined at 16 along one of their longer edges and the opposite longer edge of each wall portion includes two slots 17. Each wall component 16 is joined to two similar wall components by rectangular splines 19 which are a tight push fit in the slots 17 of adjoining wall portions of the wall components. When joined by the spline 19, the adjacent wall portions 15 are coplanar.

A square open ended box is formed by assembling four of the wall components 15 together as described above and the wall components are then locked together by the locking frame 12. The frame 12 is square and includes eight integrally formed or removable projecting splines 21 which protrude from one side of the frame. The splines 21 fit in further slots 22 formed in the ends of the wall portions 15 of the wall components. One of the open ends of the container 10 is closed off by the back panel 13 which consists of a planar panel 24 surrounded by a frame 25 identical to the locking frame 12. The back panel 13 is not necessary for the rigidity of the container and may be omitted to leave an open-ended box if desired. The back panel 13 is attached to the wall components 11 by splines 21 on the frame 25 which fit in further slots (not shown in FIG. 1 but identical to slots 22) in the other ends of the wall portions 15.

The inside faces of the wall portions 15 of each wall component are covered with a multiplicity of regularly spaced nodules 27. The nodules 27 form generally square projections on the inside surfaces of the wall portions and are arranged in rows to define channels therebetween, the channels extending in two mutually perpendicular directions. The sides of the nodules 27 are convexly curved to a small degree to facilitate insertion of shelves etc between the rows of nodules as described below. In the preferred embodiment illustrated, the completed storage container is a cube having a side dimension of one third of a meter. Thus each wall portion is a rectangle of one sixth by one third of a meter. The inside surface of each wall portion is divided into 200 equal notional squares. A nodule 27 of 11.66 mm. side and 3.33 mm. depth is placed in each of these notional squares with the exception of the row adjacent to the corner of the wall component 16 and the nodules define between them channels 29 which are 5 mm. wide. Curved corner nodules 30 are provided in the remaining row at the joint of the two wall portions 15.

Figure 2:
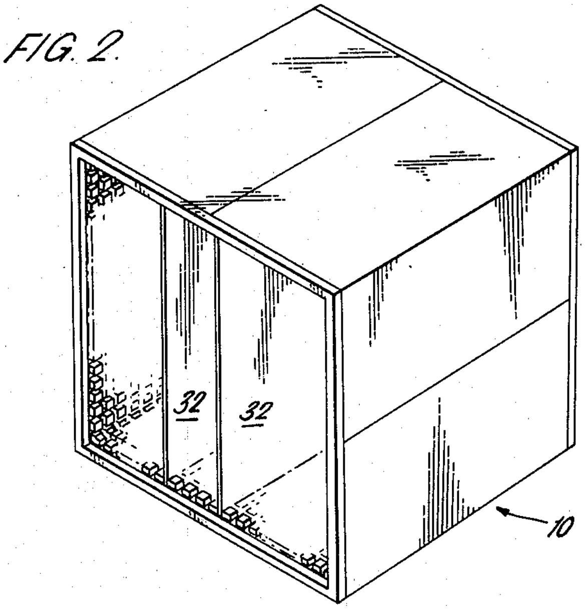
FIG. 2 is a perspective view of an assembled storage container including partitions.
Figure 3:
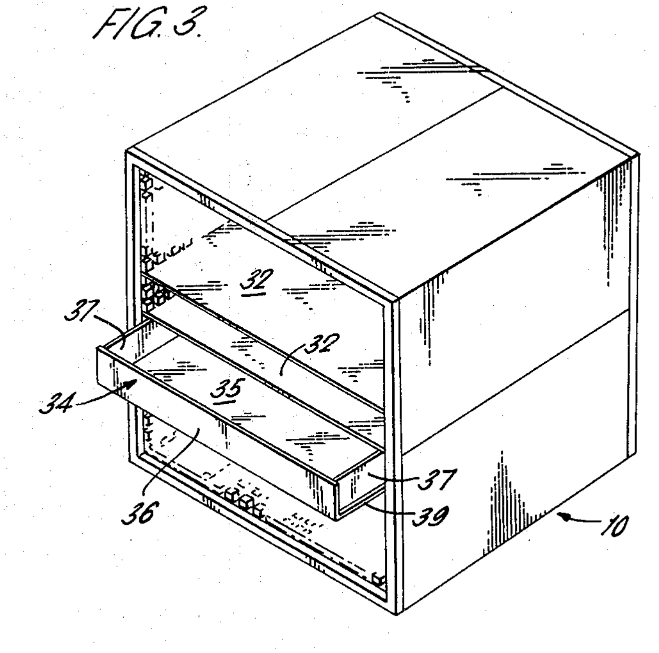
FIG. 3 is a perspective view of an assembled storage container including shelves and a drawer.

It will be realised that the channels provided between the nodules 27 permit the location of partitions, shelves, drawers etc. in many positions within the storage container 10 and examples of assembled storage containers including such partitions, shelves and drawers are illustrated in FIGS. 2 and 3. In FIG. 2, two vertical partitions 32 are illustrated. Each partition 32 is a square planar sheet of rigid material which slides in two of the channels 29 defined by the nodules.

The partition may also be used as a divider in the container by inserting the partition into channels 29 at right angles to the above channels during assembly of the container.

Similar sheets of material 32 may also serve as shelves, as illustrated in FIG. 3, when located in two channels 29 in the side walls of the container rather than in the top and bottom walls. FIG. 3 also illustrates a drawer 34. The drawer has a base 35 indentical to one of the panels 32. Extending upwardly from the base 35 are a front wall 34 attached to a front edge of the base 35, two side walls 27 spaced slightly inwardly from the side edges of the base 35 and a rear wall (not shown) attached to the rear edge of the base 35 and extending between the rear edges of side walls 37. The edge portions 39 of the base 35 protruding beyond the side walls 37 provide the runners for the drawer and slide in two of the channels 29.

The invention is by no means limited to the embodiments described in FIGS. 2 and 3 and it will quickly be seen that a very large variety of storage arrangements may be achieved within the basic container 10 by using different combinations and numbers of partitions, shelves and drawers. It will also be realised that although the basic container 10 has been described with reference to FIG. 1 as having a solid back panel 13 and an open front, various other arrangements are possible. For example, a locking frame 12 may be attached to both the front and rear of the container 10 so that it is open at both ends. Furthermore, a door may be hinged to the frame 12 to provide a closed accessible container.

Still further, a container of twice the depth of the container 10 may be constructed by attaching a further container 10 to the one illustrated in FIG. 1 in place of the rear wall 13. To achieve this, the locking frame 12 of the further container 10 is removed and further tabs 19 are inserted in the grooves 22 to connect the two containers together. To facilitate this, the grooves 17 and the grooves 22 are of identical size.

Figure 4:
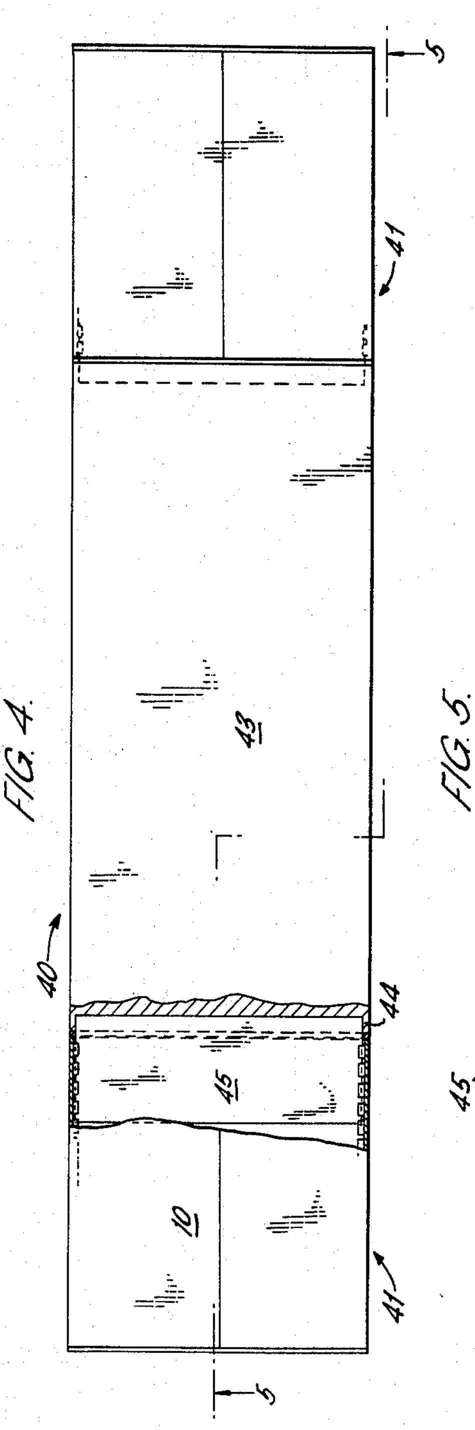
FIG. 4 is a plan view of a desk constructed from storage containers as shown in FIGS. 1 to 3.
Figure 5:
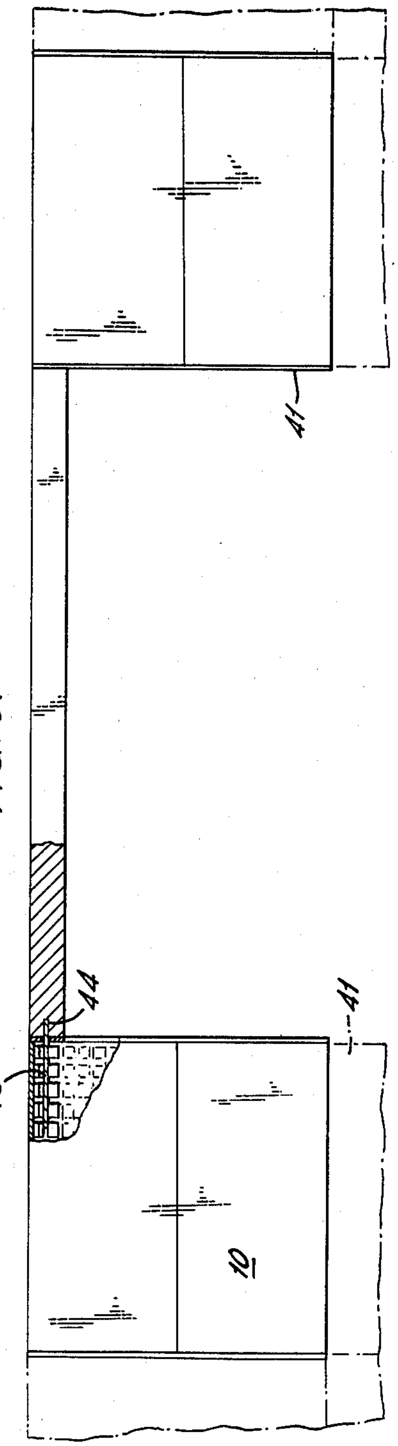
FIG. 5 is a view along the line 5—5 in FIG. 4, partly in section.

Turning now to FIGS. 4 and 5, there is illustrated a desk 40 which is constructed from containers 10. The two end plinths 41 of the desk are formed from a stack of containers 10. In the embodiment illustrated, this stack is two units high. The desk top 43 is a rectangular panel including a slot 44 formed in each end of the panel and extending for the majority of the width of the panel. The desk top is located on the plinths by rectangular sheet-like supports 45 which slide in respective channels 27 in the containers 10 and engage the grooves 44.

The desk 40 may readily be assembled by first locating the stacks of containers 10 and inserting the supports 45 in the channels 27. The supports 45 may be slid within the containers 10 and the desk top then placed in position and fixed by sliding the supports 45 outwardly to engage the grooves 44. It will be realised that the height of the desk top may readily be adjusted by sliding the supports 45 between lower rows of nodules in the containers 10.

It will be realised that although the desk 40 illustrated in FIGS. 4 and 5 is shown with a top 43 having a width equal to one container 10, a desk twice as wide may readily be provided.

The containers 10 and desk 40 as described above may readily be assembled into office units by merely stacking the containers together to provide desired storage facilities. Such assemblies may be locked together by suitable connections between the units. It will be appreciated that the standard size of the containers 10 and the numerous possible arrangements of shelves etc., within each container give very great versatility in using the containers to form office units. Moreover, the shape of the wall components forming the containers makes them readily stackable so that the necessary components for a relatively large number of containers can be stacked for transportation in a relatively small space.

Apart from the various forms of the basic storage container 10 envisaged above, other modifications may be made to the container within the scope of the invention. For example, the wall components 11 may be connected together by splines permanently attached to or integrally formed with one of the wall components rather than by the splines 19 and, indeed, any suitable form of interengaging connector may be provided on the wall components 16.

Furthermore, the partitions and shelves may themselves be provided with nodules 27 so that subdivisions may be provided within each container unit.

Further examples of containers including such shelves and partitions are illustrated in FIGS. 6 to 16.

Figure 6:
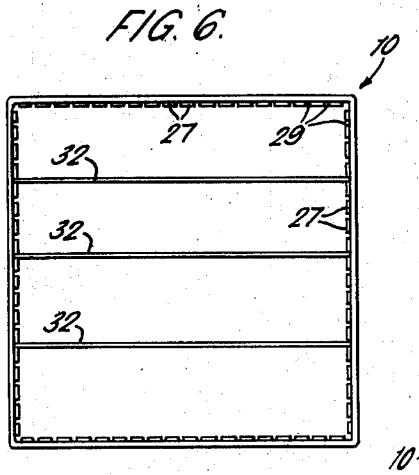
FIG. 6 shows a container with shelves.
Figure 7:
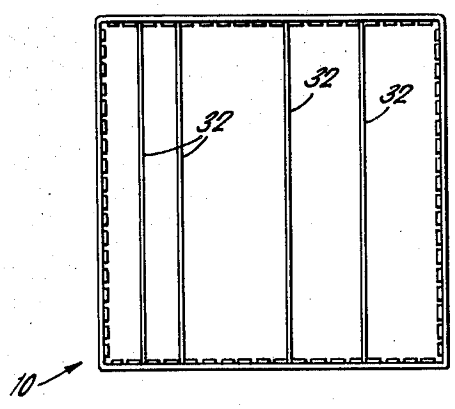
FIGS. 7 and 8 show containers with partitions.
Figure 8:
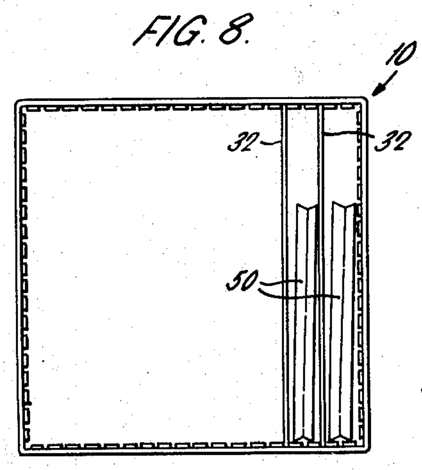

As described above square planar sheets of rigid material 32 may serve as partitions or shelves within the container 10 by insertion into opposite channels 29 defined by the nodules 27. FIG. 6 illustrates an arrangement with three such sheets 32 dividing the container 10 into four shelf spaces of two different heights and FIG. 7 illustrates an arrangement with four sheets 32 dividing the container 10 into five partitioned spaces of various widths. FIG. 8 again illustrates the use of sheets 32 to partition the container 10 and in this embodiment the partitioned spaces are of a width designed to accommodate known ring binders or other upright type files 50.

Figure 9:
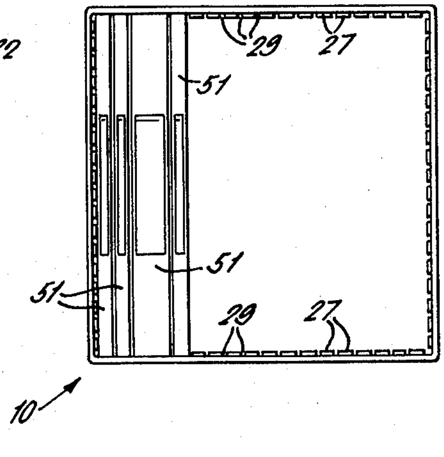
FIG. 9 shows a container housing upright files.

FIG. 9 also illustrates the use of container 10 for storing upright files. In this embodiment the files 51 are of a standard height which fits within the container 10 with the top and bottom edges of the file covers sliding in channels 29. The spines of the files are also in standard widths which are a multiple of the spacing between adjacent channels 29 as can be seen in FIG. 9 in which three files 51 are of such a width that their covers fit on either side of a single row of nodules 27 and one file 51' is of such a width that its covers fit on opposite side of two adjacent rows of nodules.

Figure 10:
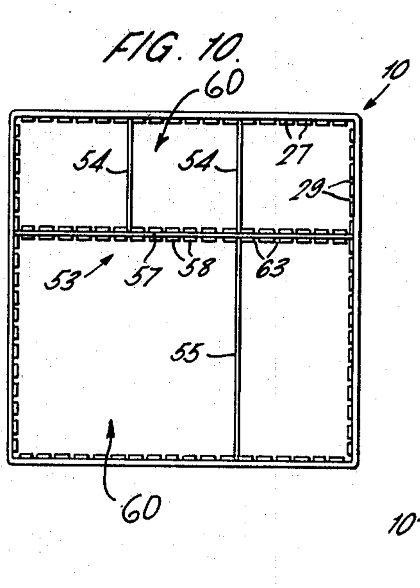
FIGS. 10 and 11 show containers with shelves and partitions.
Figure 11:
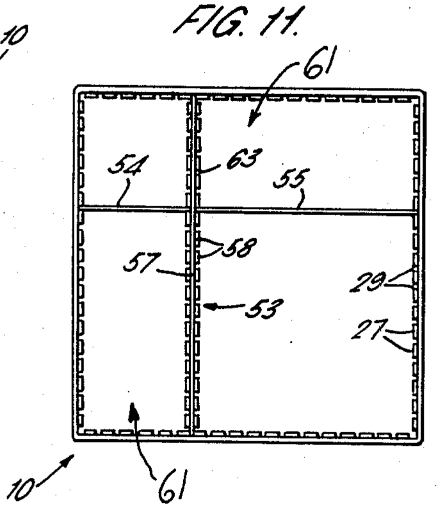

FIGS. 10 and 11 illustrate embodiments of the container 10 in which the container is sub-divided into shelf and partitioned spaces of less than the total width or height of the container by use of a divider 53 and sheets 54, 55. Each divider 53 comprises a planar sheet of rigid material 57 (which may be identical to sheets 32) covered on both sides with an array of nodules 58 corresponding in size and spacing to nodules 27. It will be appreciated that the edges of divider 53 are left free of nodules to permit sliding of the divider into channels 29 and so the array of nodules comprises 18 rows and columns.

The divider is inserted into opposed channels 29 to divide the container into two shelf spaces 60 (FIG. 10) or partitioned spaces 61 (FIG. 11). The spaces 60, 61 are then further subdivided by the rectangular sheets 54, 55, which are of the same depth as divider 53 and a width or height selected to fit between a wall of the container and the divider, into further smaller partitioned spaces or shelf spaces, the sheets 54, 55 sliding in channels 29 and opposed channels 63 between the rows of nodules on the divider 53.

Figure 12:
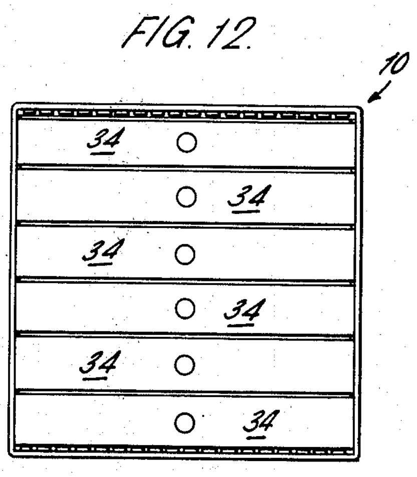
FIG. 12 shows a container with drawers only.

FIG. 12 illustrates an embodiment in which container 10 is filled with six drawers 34 which are each constructed as described above with reference to FIG. 3.

Figure 13:
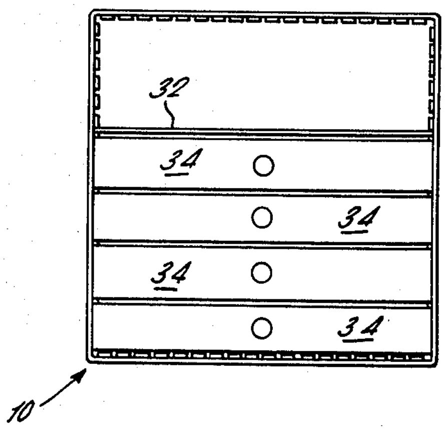
FIG. 13 shows a container with drawers and a shelf.

FIG. 13 shows a container 10 in which the lower part houses four drawers 34 and the upper part is a shelf space separated from the upper one of drawers 34 by a sheet 32 forming a shelf.

Figure 14:
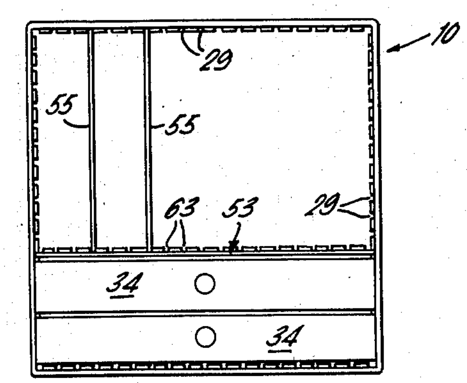
FIGS. 14 and 15 show containers with drawers and partitions.

FIG. 14 illustrates an embodiment in which two drawers 34 are slidably located in the lower part of the container 10. A divider 53 located in channels 29 immediately above the upper drawer 34 defines a shelf space above the drawers in the upper part of the container and this space is further partitioned by sheets 55.

Figure 15:
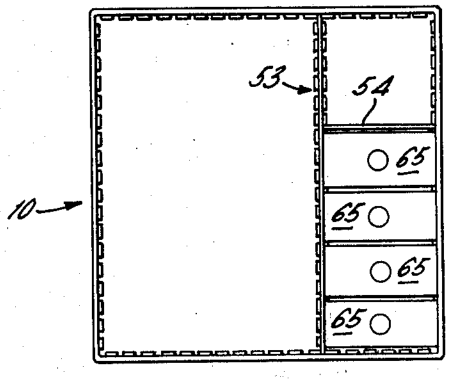

In the FIG. 15 embodiment, a divider 53 forms a partition in the container and the smaller partitioned space is divided by a sheet 54 into upper and lower shelf spaces. The lower shelf space houses four drawers 65 identical in construction to drawers 34 but of a width adapted to fit between divider 53 and the right hand wall of the container.

Figure 16:
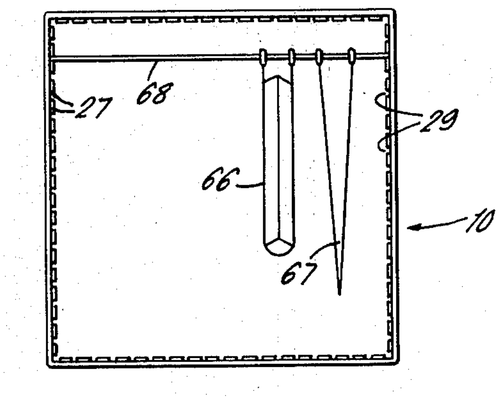
FIG. 16 shows a container with hanging files.

FIG. 16 illustrates the use of the container 10 to house hanging files of known type which may be wallet files 66 or open files 67. The files 66, 67, are suspended from two spaced parallel rods 68, only one of which is shown, located in opposed channels 29 adjacent the upper wall of the container. The ends of the rods 68 are a sliding fit in channels 29 and may be provided with transverse flanges which locate in the channels.

It will be appreciated from the above examples that the storage container 10 provides a very versatile storage system which may be divided into a great variety of combinations of shelves, partitioned spaces, drawers etc. by the use of relatively few components; divider 53; sheets 32, 54, 55 of common depth but varying widths to form shelves and partitions; drawers 34,65; and rods 68.

I claim:

1. A desk comprising a desk top and at least two modular containers each comprising a hollow open-ended polygonal box, said box being divided into a plurality of wall components along lines contained in the planar portions of the walls of the box so that at least some of the wall components include portions of at least two walls, in which means are provided on adjacent wall components for locating the said adjacent wall components together along said lines, means are provided to lock said wall components together once so located, at least one pair of opposed side walls are provided with a multiplicity of nodules arranged in rows in at least two directions over at least a substantial portion of the inside surfaces of said opposed walls for locating shelves, drawers and the like within the container in any of a number of positions, and means for connecting the disk top to said containers comprising planar members slidable between rows of nodules within the containers and engageable in slots formed in the ends of the desk top.

* * * * *